United States Patent [19]
Anan et al.

[11] Patent Number: 5,502,517
[45] Date of Patent: Mar. 26, 1996

[54] SOFT CONTACT LENS WITH A BACK SURFACE WHOSE CENTRAL AND INTERMEDIATE PORTIONS ARE FORMED BY DIFFERENT ELLIPSOIDAL SURFACES CONTINUOUSLY CONTIGUOUS TO EACH OTHER

[75] Inventors: Naoki Anan, Inuyama; Bungo Takagi, Niwa; Kazuya Miyamura, Nagoya, all of Japan

[73] Assignee: Menicon Co., Ltd., Japan

[21] Appl. No.: 232,035

[22] PCT Filed: Oct. 26, 1993

[86] PCT No.: PCT/JP93/01546

§ 371 Date: Apr. 26, 1994

§ 102(e) Date: Apr. 26, 1994

[87] PCT Pub. No.: WO94/10599

PCT Pub. Date: May 11, 1994

[30] Foreign Application Priority Data

Oct. 27, 1992 [JP] Japan .................................... 4-312969
Oct. 25, 1993 [JP] Japan .................................... 5-266438

[51] Int. Cl.$^6$ ........................................................ G02C 7/04
[52] U.S. Cl. ................. 351/160 H; 351/161; 351/160 R
[58] Field of Search ............................... 351/160 R, 161, 351/160 H

[56] References Cited

U.S. PATENT DOCUMENTS

| | | | |
|---|---|---|---|
| 3,227,507 | 1/1966 | Feinbloom | 351/160 |
| 3,482,906 | 12/1969 | Volk | 351/160 |
| 4,195,919 | 4/1980 | Shelton | 351/160 R |
| 4,561,737 | 12/1985 | Bourset et al. | 351/160 R |
| 4,640,595 | 2/1987 | Volk | 351/160 R |
| 4,765,728 | 8/1988 | Porat et al. | 351/160 R |
| 4,883,350 | 11/1989 | Muckenhirn | 351/160 R |
| 4,896,958 | 1/1990 | Ames et al. | 351/160 R |
| 5,069,542 | 12/1991 | Höfer et al. | 351/160 H |

FOREIGN PATENT DOCUMENTS

| | | |
|---|---|---|
| 0033141 | 12/1981 | European Pat. Off. . |
| 56-51322 | 12/1981 | Japan . |
| 60-113208 | 6/1985 | Japan . |
| 680954 | 12/1992 | Switzerland . |
| 1156454 | 6/1969 | United Kingdom . |

*Primary Examiner*—David C. Nelms
*Assistant Examiner*—Andrew Q. Tran
*Attorney, Agent, or Firm*—Parkhurst, Wendel & Rossi

[57] ABSTRACT

The present invention was developed to improve wearing conditions of a soft contact lens while improving production efficiency of the soft contact lens and assuring an enhanced optical effect offered by the lens. The present soft contact lens has a back surface, a front surface and a connecting surface. The back surface of the lens is constituted by: a central portion formed by an ellipsoidal surface with an eccentricity in the range of 0.2–0.7 and a vertex radius of curvature in the range of 5.00–10.00 mm; an intermediate portion which is located at the periphery of the central portion so as to surround the central portion and is formed by another ellipsoidal surface with an eccentricity in the range of 0.2–0.7, at least one of the eccentricity and a vertex radius of curvature of the ellipsoidal surface of the intermediate portion being different from that of the ellipsoidal surface of the central portion; and a marginal portion which is located around the periphery of the intermediate portion and formed so that the marginal portion is spaced away from the cornea such that an axial clearance between the cornea and the back surface of the contact lens increases with an increase in a distance of the marginal portion from the intermediate portion in a radially outward direction. The central, intermediate and marginal portions are continuously contiguous to each other to provide the back surface of the lens.

10 Claims, 1 Drawing Sheet

SOFT CONTACT LENS WITH A BACK SURFACE WHOSE CENTRAL AND INTERMEDIATE PORTIONS ARE FORMED BY DIFFERENT ELLIPSOIDAL SURFACES CONTINUOUSLY CONTIGUOUS TO EACH OTHER

BACKGROUND OF THE INVENTION

1. Field of the Art

The present invention relates in general to a soft contact lens, and more particularly to an improvement in the configuration of a back surface of the soft contact lens, the back surface serving as a cornea-contacting surface which contacts a cornea of a human eye.

2. Discussion of the Prior Art

The configuration of a contact lens should be determined so as to satisfy the following three major requirements A through C, for assuring a contact lens wearer of comfortable wearing conditions of the lens, i.e., good adaptability and compatibility properties of the lens. The three major requirements are as follows.

A: The back surface of the contact lens is formed in a concave shape, so that the back surface of the lens may suitably fit the shape (convex) of the cornea of the lens wearer.

B: The configuration of the peripheral portion of the lens permits good circulation of the tear fluid existing between the cornea and the back surface of the lens.

C: The lens as a whole has a smooth surface and a small wall thickness, to thereby decrease discomfort as felt by the contact lens wearer when he blinks.

It is known that the surface of the human cornea is not a truly spherical surface, but an aspherical surface whose curvature generally increases from its center toward its periphery. In view of this fact, various attempts have been made to adapt the configuration of the back surface of the contact lens so as to satisfy the above-mentioned requirement A.

More specifically described, a contact lens having an ellipsoidal back surface has been proposed since the configuration of the cornea of the human eye approximates an ellipsoidal surface. For example, U.S. Pat. No. 3,482,906 to David Volk discloses a hard contact lens whose entire back surface is formed by a single ellipsoidal surface. Although the disclosed contact lens permits better wearing conditions as compared with a contact lens whose back surface is made spherical, the contact lens does not necessarily satisfy the requirement A as indicated above, that is, the back surface of the contact lens does not closely fit the cornea, because of its single ellipsoidal back surface configuration.

Described in detail, the curvature of the cornea changes such that the radius of curvature of the cornea increases from its center toward its periphery as stated above, but the rate of change in the curvature is not constant. If the entire back surface of the contact lens is formed by adopting an eccentricity which is determined based on the rate of change in the curvature at the central portion of the cornea, the peripheral portion of the back surface of the contact lens contacts too closely to the cornea, placing the contact lens in a so-called "steep" condition in which the central portion of the contact lens is spaced apart from or floats above the cornea. On the other hand, if the back surface of the lens is formed to have an eccentricity determined based on the rate of change in the curvature at the peripheral portion of the cornea, the lens is placed in a so-called "flat" condition wherein the peripheral portion of the lens floats away from the cornea.

Further, the contact lens disclosed in the above publication is not satisfactory in achieving the configuration of the peripheral portion of the lens to satisfy the above-mentioned requirement B, that is, to permit good circulation of the tear fluid between the back surface of the lens and the cornea since the peripheral portion of the lens is apart from the cornea by a great distance, making it difficult to obtain a suitable clearance between the lens and the cornea. When the clearance between the peripheral portion of the lens and the cornea is too large, it gives rise to problems that the lens wearer feels more frequently the feeling of discomfort when the wearer blinks and that the lens tends to slip off from the eye due to the blinking.

For avoiding the inconveniences as stated above, there is a need to prepare a considerably large variety of lenses for fitting the individual corneal shapes of the wearers. In fact, the above-mentioned publication discloses that the various kinds of lenses are prepared which have various shapes and sizes. However, it is not desirable to prepare such a wide variety of lenses, in view of the productivity of the lens.

The above problems are solved to some extent by a contact lens as proposed in U.S. Pat. No. 4,883,350 to Dieter Muckenhirn wherein the central portion of the back surface of the lens (i.e., the angular area ranging between 10° and 20° measured from the center of curvature of the back surface of the lens) is made spherical, whereas the peripheral portion adjacent to the central spherical portion is made aspherical, such as elliptical. However, the disclosed lens fails to satisfy the requirement A indicated above since the spherical surface of the central portion of the contact lens is not compatible with the aspherical surface of the cornea which is approximately ellipsoidal. The publication explains that the central portion of the back surface of the lens is made spherical to provide an accurate dioptric power of the lens. Yet because of the central spherical portion, the lens tends to be adversely influenced by spherical aberration.

Still another example is disclosed in U.S. Pat. No. 4,765,728, wherein the back surface of the lens includes a central zone constituted by a first second-order surface of revolution other than spherical, and a marginal zone constituted by a second second-order surface of revolution other than spherical, which second second-order surface is different from the first second-order surface of revolution. In this contact lens, the transition from the first second-order surface of revolution to the second second-order surface of revolution lies on a tangent common to both curves of the two surfaces, and an axial clearance between the cornea and the back surface of the lens increases toward the edge of the lens as the marginal zone of the lens gradually separates from the cornea. However, if the configuration of the back surface according to this arrangement is applied to a soft contact lens, it would cause a problem that the lens is likely to be positioned away from the cornea over its area ranging from the peripheral portion through the central portion (serving as the optical portion) thereof, leading to deterioration of the wearing conditions of the lens and slipping of the lens from the cornea.

As is apparent from the above explanation, any one of the conventionally proposed configurations of the back surface of the contact lens does not assure the contact lens wearers of comfortable wearing conditions when the proposed configurations of the back surface are directly applied to a soft contact lens.

SUMMARY OF THE INVENTION

The present invention was developed in the light of the above-described situations. It is therefore an object of the invention to provide a soft contact lens which is formed so as to satisfy the above-indicated three major requirements A through C for improving the wearing conditions of the lens, i.e., compatibility and adaptability of the lens, while improving the production efficiency of the soft contact lens and assuring enhanced optical effect offered by the lens.

To achieve the above object, the present invention provides a soft contact lens having a back surface which is to face a cornea, a front surface which cooperates with the back surface so as to provide a desired degree of dioptric power of the lens, and a connecting surface for continuously connecting the back and front surfaces of the lens to each other, the soft contact lens being characterized in that the back surface is constituted by: a central portion which is to contact the cornea and serves as an optical lens portion, the central portion being formed by an ellipsoidal surface with an eccentricity in the range of 0.2 to 0.7, and a vertex radius of curvature in the range of 5.00–10.00 mm; an intermediate portion which is to contact the cornea and is located at the periphery of the central portion so as to surround the central portion, the intermediate portion being formed by another ellipsoidal surface with an eccentricity in the range of 0.2 to 0.7, at least one of the eccentricity and a vertex radius of curvature of the ellipsoidal surface of the intermediate portion being different from that of the ellipsoidal surface of the central portion; and a marginal portion which is located around the periphery of the intermediate portion and formed so that the marginal portion is spaced away from the cornea such that an axial clearance between the cornea and the back surface of the contact lens increases with an increase in a distance of the marginal portion from the intermediate portion in a radially outward direction, the central, intermediate and marginal portions being continuously contiguous to each other to provide the back surface of the lens.

BRIEF DESCRIPTION OF A DRAWING

The present invention will be better understood by reading the following detailed description of a presently preferred embodiment of the invention, when considered in connection with the accompanying drawing in which:

FIG. 1 is a cross-sectional view for explaining a configuration of a soft contact lens according to the present invention.

DETAILED DESCRIPTION OF THE PREFERRED EMBODIMENT

Figure 1:
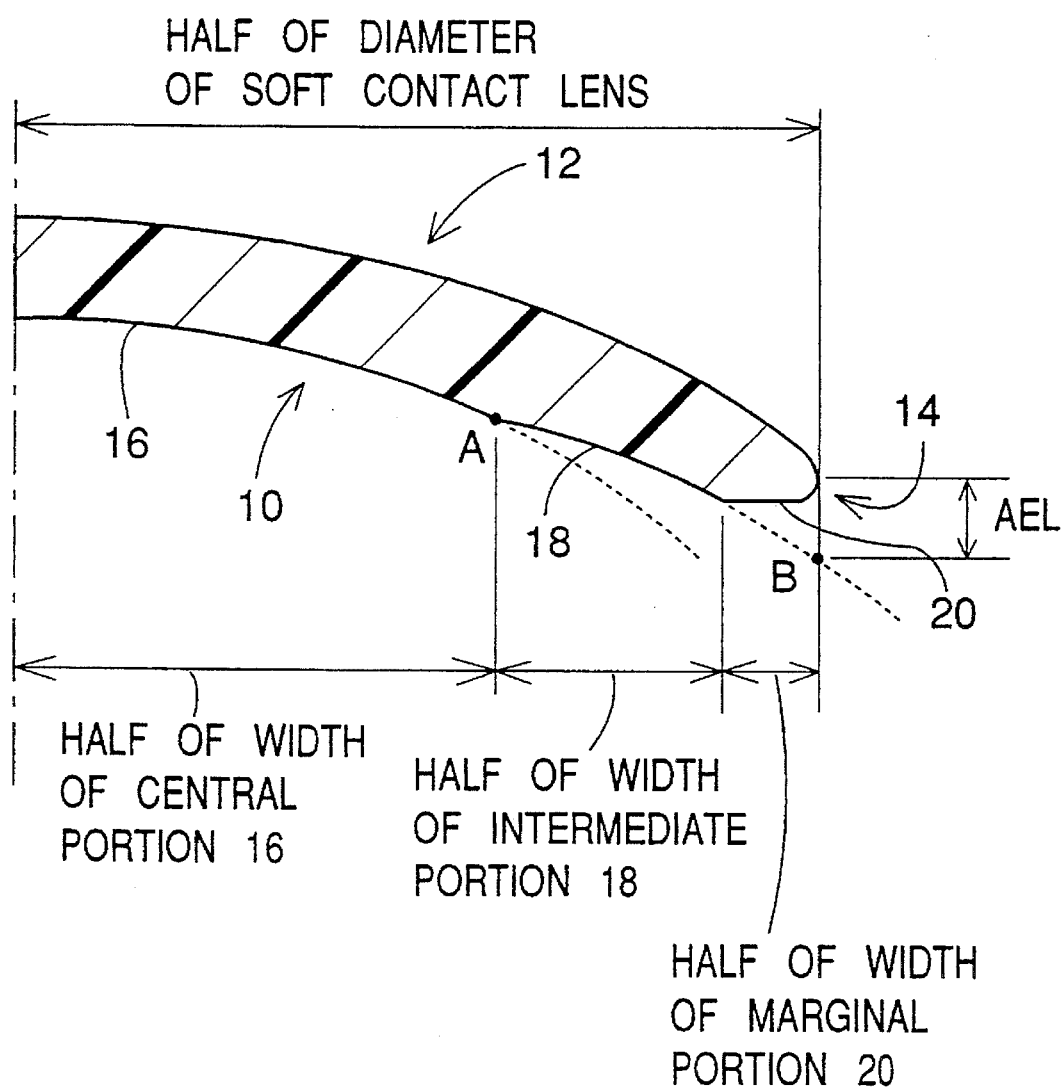

A soft contact lens as shown in FIG. 1 includes a back surface 10 which is to face a cornea of a human eye, a front surface 12 which cooperates with the back surface 10 to provide a desired degree of dioptric power of the lens, and a connecting surface 14 for continuously connecting the back and front surfaces of the lens. In the present soft contact lens, the back surface 10 is constituted by: a central portion 16 which is to contact the cornea and serves as an optical lens portion; an intermediate portion 18 which is located at the periphery of the central portion 16 with a predetermined width so as to surround the central portion 16 and which is to contact the cornea; and a marginal portion 20 which is located around the periphery of the intermediate portion 18 and which is not to contact the cornea.

The central portion 16 of the back surface 10 of the present soft contact lens is formed by an ellipsoidal surface with an eccentricity in the range of 0.2 to 0.7, and a radius of curvature in the range of 5.00–10.00 mm, such that the central portion 16 serves as an effective contacting surface with respect to the cornea. These numerical values specifying the ellipsoidal surface of the central portion 16 are obtained by approximation based on the shapes of human eyes so as to be suitable to average human eyes. In determining the ellipsoidal surface of the central portion 16 more specifically, suitable values are selected from the above-specified ranges depending upon the corneal shapes of the individual lens wearers. In actual application, several numerical values are selected at suitable intervals from the above-indicated ranges to prepare several kinds of soft contact lenses, from which is selected a lens which is most suitable for the wearer. It is preferable that the ellipsoidal surface of the central portion 16 have an eccentricity in the range of 0.3–0.6, and a radius of curvature in the range of 7.00–9.00 mm so that reduced kinds of contact lenses are applicable to a relatively large number of the lens wearers.

In the soft contact lens according to the present invention, the ellipsoidal surface of the central portion 16 is determined as follows:

$(x^2/a^2)+(y^2/b^2)=1$ (general formula for an ellipse)

$$\epsilon = \sqrt{(b^2-a^2)/b}$$

$R=a^2/b$ where, $\epsilon$:eccentricity

R:vertex radius of curvature $$a = R/\sqrt{(1-\epsilon^2)}$$

$b=R/(1-\epsilon^2)$

It is noted that since the width (diameter) of the central portion 16 represents an effective optical diameter, it is desirable to obtain a larger optical lens portion from the optical viewpoint. To this end, the width (diameter) of the ellipsoidal central portion 16 is preferably determined to be equal to about 75–93% of the overall width (diameter) of the soft contact lens, more preferably, about 75–85% of the overall width (diameter) of the lens. For a soft contact lens having an overall diameter of 14.00 mm, for instance, the diameter of the central portion 16 is determined to be about 11 mm.

The thus formed central portion 16 of the back surface of the soft contact lens suitably matches the shape of the human cornea, thereby effectively improving the wearing comfort as felt by the lens wearers, i.e., the compatibility and adaptability properties of the lens. Further, the present contact lens having the ellipsoidal central portion 16 is capable of producing clearer images than the conventional lens having a spherical central portion due to a reduced degree of spherical aberration. Take a contact lens having the dioptric power of −10D (diopters) for example, the spherical aberration is reduced by as much as 0.5D when the central portion 16 of the back surface is made ellipsoidal, as compared with the lens having a spherical central portion.

The back surface 10 of the present soft contact lens has the intermediate portion 18 at the periphery of the central portion 16 and which contacts the cornea. The intermediate portion 18 is formed by another ellipsoidal surface having an eccentricity selected from a range of 0.2–0.7 so that the configuration of the intermediate portion 18 closely matches the corresponding peripheral portion of the cornea. The ellipsoidal surface of the intermediate portion 18 is determined such that at least one of the eccentricity and vertex radius of curvature thereof is different from that or those of the ellipsoidal surface of the central portion 16. Accordingly, the central portion 16 and intermediate portion 18 cooperate with each other to provide the cornea-contacting surface of the lens in which the two different ellipsoidal surfaces are continuously and smoothly contiguous to each other.

The ellipsoidal surface of the intermediate portion 18 is determined in the following manner.

That is, the general formula for an ellipse; $(x^2/a^2)+(y^2/b^2)=1$, may be converted into the following equation, based on the definitions $$\epsilon' = \sqrt{(b'^2 - a'^2)/b'}\quad,$$

and $R'=a'^2/b'$:

$(1-\epsilon'^2)x^2+(1-\epsilon'^2)^2\,(y-y')^2=R'^2,$ where, $y'=(y1+y2)/2+(x1^2-x2^2)/[2\times(y1-y2)\times(1-\epsilon'^2)],$ E':eccentricity R':vertex radius of curvature As shown in FIG. 1, there are first selected a point A (x1, y1) which lies on the boundary between the central portion 16 and the intermediate portion 18 of the back surface 10 of the soft contact lens, and a point B (x2, y2) on the cornea which is ordinarily aligned with the periphery (the end of the whole width) of the soft contact lens when the point A lies on the cornea. Then, the eccentricity $\epsilon'$ which approximates the shape of the cornea between these points is selected so as to define one ellipsoidal surface by determining a' and b' according to the following equations:

$$a' = \sqrt{[x1^2/(1-\epsilon'^2) + (y1-y')^2]}$$

$$b' = a' \times \sqrt{(1-\epsilon'^2)}$$

The vertex radius of curvature R' of the intermediate portion 18 can be calculated from the two points A, B as indicated above and the eccentricity $\epsilon'$, and under the condition that the center of the radius of curvature of the ellipsoidal surface lies on the optical axis of the soft contact lens.

The width of the intermediate portion 18 (2×width as indicated in FIG. 1) is preferably determined to be about 5–25% of the overall width (diameter) of the lens, more preferably, about 10–20% of the overall width (diameter) of the lens. The width of the intermediate portion 18 determined within the above-specified range assures a suitable amount of AEL (Axial Edge Lift) at the marginal portion 20 which will be described in detail. For a soft contact lens having a diameter of 14.0 mm, for example, the width of the intermediate portion 18 is determined to be about 2.5 mm.

The thus formed intermediate portion 18 cooperates with the central portion 16 to provide the cornea-contacting surface of the present soft contact lens, in which the two different ellipsoidal surfaces are continuously and smoothly contiguous to each other, so that the central portion 16 and the intermediate portion 18 of the back surface 10 of the lens closely approximate corresponding central and peripheral portions of the cornea of the human eye, respectively. This configuration of the back surface of the present soft contact lens effectively prevents the lens from being placed in the so-called "steep" or "flat" condition as explained above, whereby the wearing comfort of the lens as felt by the wearers is considerably enhanced.

The back surface 10 of the soft contact lens formed as described above closely matches both the central and peripheral portions of the cornea of the human eye and permits good adaptation of the lens to a large variety of corneal shapes of the individual lens wearers. In the present invention, therefore, the number of kinds of the soft contact lens can be advantageously reduced, resulting in an improvement in the productivity of the soft contact lens.

The central portion 16 and intermediate portion 18 of the back surface 10 are formed by the respective ellipsoidal surfaces which are continuously contiguous to each other as explained above. This arrangement provides a geometrical feature, namely, a slightly recessed portion near the boundary between the central portion 16 and the intermediate portion 18 of the back surface 10, which recessed portion has a reduced thickness as compared with that of the conventional soft contact lens having a spherical back surface. Accordingly, the present soft contact lens is free from the problem of excessive pressure on the cornea by the conventional soft contact lens.

The back surface 10 of the present soft contact lens has the marginal portion 20 formed around the periphery of the intermediate portion 18. The marginal portion 20 does not directly contact the cornea, but is formed so that the marginal portion 20 is gradually spaced away from the cornea such that the axial clearance between the cornea and the back surface of the lens increases with an increase in a distance of the marginal portion 20 from the intermediate portion 18 in a radially outward direction. The configuration of the marginal portion 20 may be any of a plane, a spherical or an aspherical surface provided that the configuration of the marginal portion 20 assures a desired amount of axial edge lift (AEL) at the edge of the contact lens. The AEL means an amount of clearance between the peripheral portion of the soft contact lens and the cornea, which permits an effective circulation of the tear liquid existing between the back surface of the soft contact lens and the cornea and which assures good mobility of the contact lens on the cornea. To this end, the amount of the axial edge lift (AEL) is preferably large. However, to minimize discomfort as felt by the lens wearer, the amount of the axial edge lift (AEL) is preferably held within a range of about 0.04–0.08 mm. In view of this, the width of the marginal portion 20 (2×width as indicated in FIG. 1) is preferably determined to be about 2–7% of the overall width (diameter) of the soft contact lens, more preferably about 3–5% of the overall width (diameter) of the lens.

The front surface 12 of the present soft contact lens may have any configuration without changing the principle of the invention as far as the configuration of the front surface 12 cooperates with the back surface 10 to provide a desired degree of dioptric power of the lens. The configuration of the front surface 12 is suitably determined such that the soft contact lens as a whole is smoothly formed and has a small thickness. In this respect, it is desirable that the front surface 12 be formed to have an aspherical surface (an ellipsoidal surface, for example), like the aspherical surface of the back surface 10, in order to have the lens with a smoothed overall shape and to minimize the spherical aberration. The connecting surface 14 is formed so as to serve as an area for assuring continuous contiguity between the front surface 12 and the back surface 10.

While the present invention has been described in its preferred embodiment, it is to be understood that the invention is not limited to the details of the illustrated embodiment. It is also to be understood that the present invention may be embodied with other various changes, modifications and improvements that may occur to those skilled in the art without departing from the scope of the present invention.

INDUSTRIAL UTILITY

In the present soft contact lens, the central portion and intermediate portion of the back surface of the lens cooperate with each other to function as a cornea-contacting surface, in which the two different ellipsoidal surfaces are continuously contiguous to each other. The ellipsoidal surface of the central portion of the back surface closely matches the corresponding central portion of the cornea while the intermediate portion of the back surface closely matches the corresponding peripheral portion of the cornea adjacent to the central portion thereof. According to this arrangement, the back surface of the lens closely approximates the aspherical configuration of the cornea, to thereby effectively enhance the compatibility and adaptability properties of the lens and wearing comfort of the lens as felt by the wearers.

Further, the back surface of the present soft contact lens is formed such that it closely approximates the configuration of the central and peripheral portions of the cornea. The thus formed lens may accommodate some difference in the shape of the cornea among individual wearers without a significant deterioration of the function thereof, and can be used for a relatively wide variety of the cornea shapes. Accordingly, the number of kinds of the lenses to be produced can be favorably reduced, leading to improvement in the productivity of the lenses.

Unlike the conventional soft contact lens with the single spherical back surface, the present soft contact lens has the back surface whose central and intermediate portions are constituted by respective ellipsoidal surfaces which are formed with continuous contiguity to each other. This configuration of the back surface of the lens gives a geometrical feature that the back surface of the lens has a recessed portion near the boundary between the central portion and the intermediate portion, which recessed portion has a reduced thickness. In other words, the conventional soft contact lens is pressed against the cornea due to the shape of the back surface of the lens. However, the present soft contact lens is free from the conventionally experienced problem as described above, since the cornea is protected against such pressure, owing to the reduced thickness at the pressed portion.

Furthermore, the conventional soft contact lens whose back surface is made spherical greatly suffers from the spherical aberration. However, according to the soft contact lens of the present invention, the spherical aberration is effectively reduced at its optical lens portion since the central portion of the back surface of the lens serving as the optical lens portion is constituted by the ellipsoidal surface, whereby the present soft contact lens is capable of producing clearer images.

What is claimed is:

1. A soft contact lens having a back surface which is to face a cornea, a front surface which cooperates with said back surface so as to provide a desired degree of dioptric power of the lens, and a connecting surface for continuously connecting said back and front surfaces of said lens to each other, said soft contact lens being characterized in that: said back surface is constituted by: a central portion which is to contact said cornea and serves as an optical lens portion, said central portion being formed by an ellipsoidal surface with an eccentricity in the range of 0.2–0.7, and a vertex radius of curvature in the range of 5.00–10.00 mm; an intermediate portion which is to contact said cornea and is located at the periphery of said central portion so as to surround said central portion, said intermediate portion being formed by another ellipsoidal surface with an eccentricity in the range of 0.2–0.7, at least one of the eccentricity and a vertex radius of curvature of said ellipsoidal surface of said intermediate portion being different from that of said ellipsoidal surface of said central portion; and a marginal portion which is located around the periphery of said intermediate portion and formed so that said marginal portion is spaced away from said cornea such that an axial clearance between said cornea and said back surface of said contact lens increases with an increase in a distance of said marginal portion from said intermediate portion in a radially outward direction, said central, intermediate and marginal portions being continuously contiguous to each other to provide said back surface of said lens.

2. A soft contact lens according to claim 1, wherein said central portion of said back surface is formed by an ellipsoidal surface with an eccentricity in the range of 0.3–0.6, and a vertex radius of curvature in the range of 7.00–9.00 mm.

3. A soft contact lens according to claim 1, wherein said central portion of said back surface has a width which is about 75–93% of the overall width of said contact lens.

4. A soft contact lens according to claim 3, wherein said central portion of said back surface has a width which is about 75–85% of the overall width of said contact lens.

5. A soft contact lens according to claim 1, wherein said intermediate portion of said back surface has a width which is about 5–25% of the overall width of said contact lens.

6. A soft contact lens according to claim 5, wherein said intermediate portion of said back surface has a width which is about 10–20% of the overall width of said contact lens.

7. A soft contact lens according to claim 1, wherein-said marginal portion of said back surface has a width which is about 2–7% of the overall width of said contact lens.

8. A soft contact lens according to claim 7, wherein said marginal portion of said back surface has a width which is about 3–5% of the overall width of said contact lens.

9. A soft contact lens according to claim 1, wherein said marginal portion of said back surface is formed to provide an axial edge lift (AEL) within a range of 0.04–0.08 mm, between the marginal portion of said back surface and a corresponding marginal portion of said cornea.

10. A soft contact lens according to claim 9, wherein said marginal portion is formed by one of a plane, a spherical or an aspherical surface and said amount of axial edge lift (AEL) is selected within the range of 0.04–0.08 mm.

* * * * *